Nov. 24, 1953
C. O. BALL
2,660,513
METHOD OF STERILIZING GLASS CONTAINERS
Filed June 30, 1949
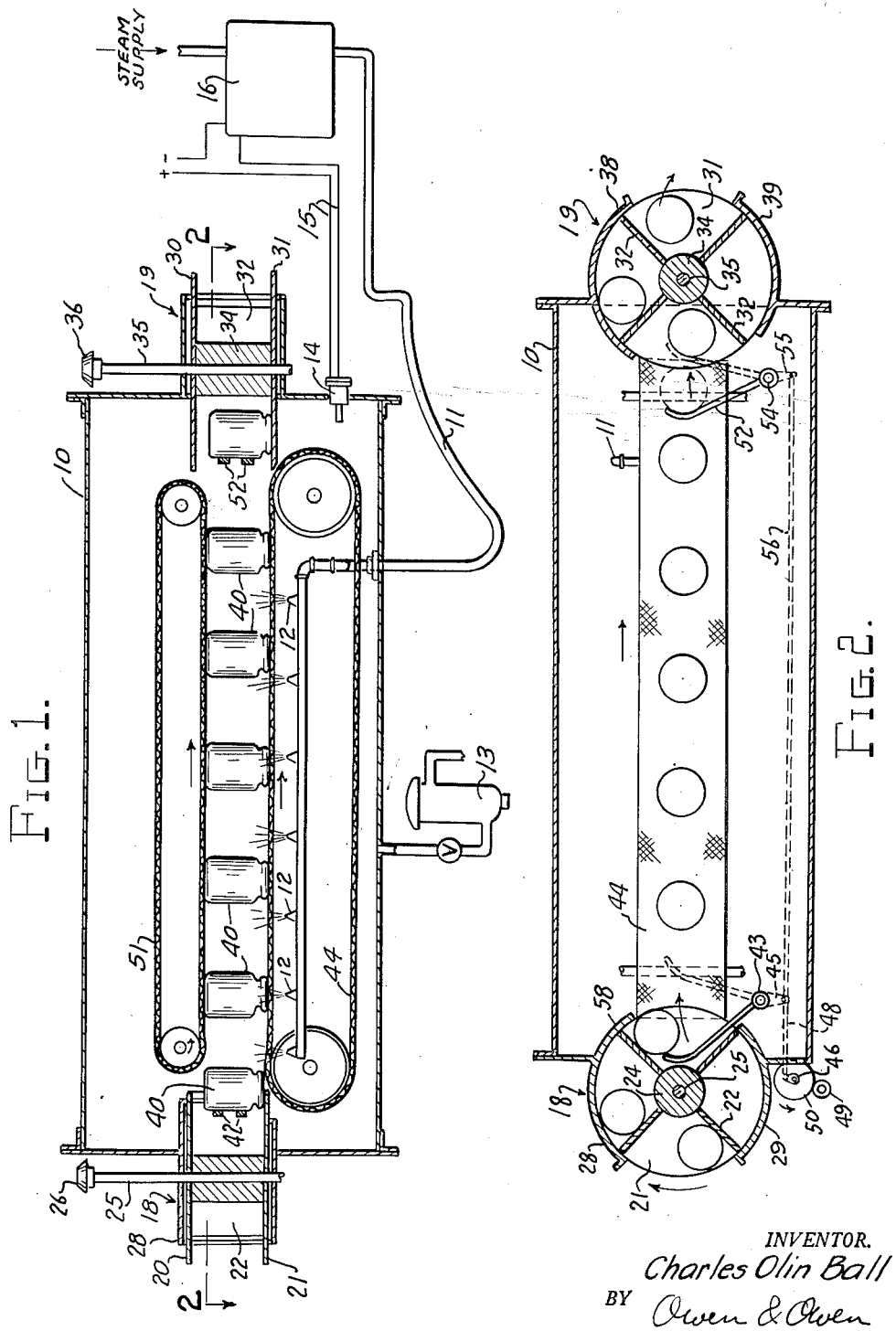
INVENTOR.
Charles Olin Ball
BY Owen & Owen
ATTORNEYS Patented Nov. 24, 1953

2,660,513

UNITED STATES PATENT OFFICE 2,660,513

METHOD OF STERILIZING GLASS CONTAINERS

Charles Olin Ball, Maumee, Ohio

Application June 30, 1949, Serial No. 102,347

2 Claims. (Cl. 21—56)

This invention relates to methods for sterilizing glass containers and is particularly pertinent to high temperature sterilizing processes for soft glass containers.

In packaging foods, either solid or liquid, beverages, drugs and the like, in glass containers it is frequently necessary to sterilize the containers to prevent subsequent spoilage. Because of the large number of units which must be handled in the packaging industry, it is an economic necessity that these containers be sterilized as rapidly as possible. The fact that rapid sterilization is desirable has been apparent to this industry for many years. One of the primary problems, however, arises from the fact that the thermal stresses set up when the glass containers are rapidly heated to the high sterilizing temperatures necessary for short time sterilization processes are such that a relatively large proportion of the containers become cracked or broken. Factors underlying this cracking of the glass containers are the composition of the glass, the thickness of the walls of the container and the amount of temperature change to which the containers are subjected.

Although glass compositions are known which can withstand the rigors of the usual high temperature sterilization processes, mass production of such containers has not as yet become economically feasible. The possibility of reduction in wall thickness of the containers is limited, since these containers must be so constructed as to withstand rough handling and, in the case of bottled beverages, considerable internal pressure. At the present time, most of the processes directed to the solution of this problem involve preheating the containers prior to the actual sterilization step, followed by slow, controlled cooling. Actually, these prior art processes cannot be considered as solutions to this problem because very little, if any, time in the over-all process is saved.

It is, therefore, an object of this invention to provide a method for sterilizing glass containers at high temperatures and within short periods of time without damaging the containers by reason of rapid heat changes.

Another object of this invention is to provide a method for sterilizing glass containers at the high temperatures required by short period sterilization processes in which the container is subjected to rapid heating involving a wide temperature differential between the container and the heating medium without cracking or otherwise injuring the container.

Other objects and advantages of the present invention will become apparent to those skilled in the art from the following description thereof when read in conjunction with the accompanying drawings, in which:

Fig. 1 is a side elevation, partly in section, of a schematic embodiment of the present invention, and Fig. 2 is a plan view of the apparatus shown in Fig. 1 taken on line 2—2 thereof.

In general, the present invention relates to a method of sterilizing glass containers at high temperatures, such as 240° F. to 325° F., which comprises completely contacting all of the surfaces of the container while at approximately room temperature with a heating medium, heated to the sterilization temperature, within a predetermined time after the first contact between the heating medium and the container.

I have found that by heating the exterior and the interior of the glass containers approximately simultaneously, or within a given maximum time for any given glass container, ordinary soft glass containers which are at room temperature may be immediately subjected to the high sterilization temperatures, usually considerably in excess of 212° F., without in any way injuring these containers.

In order to provide a graphic illustration of the present invention, reference will now be made to the accompanying drawings in which the numeral 10 designates an air-tight container. Steam from a supply pipe 11 is introduced into the chamber 10 through dispersing nozzles 12—12, and the condensate is removed through a steam trap 13. A thermocouple 14, or other electrical device sensitive to temperature changes, is connected by means of lead wires 15—15 to an electrically operated valve 16 located in the supply line 11. In this manner, the introduction of steam into the chamber 10 is regulated according to the temperature in the chamber.

At opposite ends of the chamber 10 are positioned an entrance air lock 18 and an exit air lock 19. The air lock 18 may take any suitable form but preferably comprises an inner, rotatable drum having an upper circular plate 20 and a lower circular plate 21 positioned in rigid, parallel relation to one another by partition members 22—22. A cylindrical base 24 also connects plate 20 at plate 21 and is fixedly mounted upon a rotatable shaft 25. A bevel gear 26 mounted upon one end of the shaft 25 engages a suitable driving mechanism, not shown, so as to rotate the inner drum of the air lock 18. Vertically disposed shields 28 and 29 are positioned about either side of the inner drum of the air lock 18 so as to seal the interior of the chamber 10 from the outside atmosphere. Although not shown in the schematic embodiment of the present invention illustrated in the accompanying drawings, it will be evident to those skilled in the art that a suitable type of gasket or other sealing means may be provided to maintain the rotating drum in air-tight relation with shields 28 and 29.

Air lock 19 is of similar construction to air lock 18, and comprises a rotatable drum formed by parallel plates 30 and 31 spaced from one another by partition members 32—32. A cylindrical base 34 is fixedly attached to a rotatable shaft 35 which is driven through a bevelled gear 36 by some suitable power source not shown. Vertically disposed shields 38 and 39 are positioned in air-tight relation with the inner drum so as to seal the interior of the chamber 10 from the outside atmosphere.

The glass bottles 40—40 shown in the accompanying drawings are introduced through the air lock 18 by the rotation of the inner drum. As the containers 40—40 are carried into the interior of the chamber 10, a pair of fingers 42—42 pivoted as at 43 move the containers or bottles from the lower plate 21 to a perforate or screen-type endless belt 44. Reciprocal motion is imparted to the fingers 42—42 by a lever arm 45 which is actuated from a crank arm 46 through a link 48 pivotally connected both to the crank arm 46 and to the lever arm 45. A driving gear 49 drives a gear 50 which in turn causes rotation of the crank 46.

The bottles 40—40 move along the screen-type endless belt 44 so that the mouths of the bottles are directly over the steam nozzles 12—12. In order to securely hold the bottles upright during the sterilization treatment a second perforate or screen-type endless belt 51 is positioned above the first belt 44 so as to retain the bottles 40—40 in frictional engagement between belts 44 and 51.

As the bottles 40—40 approach the exit air lock 19, they are engaged by a pair of fingers 52—52 which move the containers from the belt onto the plate 31 and, upon rotation of the air lock 19, the bottles are removed from the chamber 10. Fingers 52—52 are pivoted as shown at 54 and are actuated by a lever 55 connected to a crank 46 through a connecting rod 56 and the link 48. Thus fingers 42—42 and 52—52 are operated in synchronism with one another.

The bottles 40—40, while at some temperature approximating room temperature, are positioned upon the lower plate 21 within the compartments formed by partition members 22—22 in the manner indicated in Fig. 2. By positioning the bottles to the outside and to one side of the compartments in the rotating drum, operation of the metal fingers 42—42 is facilitated. As the shaft 25 rotates and thus rotates the inner drum formed by plates 20, 21 and partition members 22—22, the bottles 40—40 are carried into the interior of chamber 10. The shield 28 is preferably extended as shown at 58 in order to decrease the time between the first contact of the outside of the bottles 40—40 with steam from chamber 10 and the projection of steam from nozzles 12—12 into the interior of the bottles 40—40 as they are introduced into the chamber 10. It will be obvious to one skilled in the art that the steam nozzle 12 positioned nearest the entrance air lock 18 can be so located as to project steam into the interior of the glass bottles susbtantially simultaneously with the contact of the exterior of these bottles with the steam from chamber 10. There is thus no prolonged temperature difference between the atmosphere within and outside the container.

Fingers 42—42 move each bottle 40—40 from the air lock 18 onto the screen-type endless belt 44 and into frictional engagement between the two endless belts 51 and 44. The endless belt 44 has been depicted as perforated in order to permit the steam projected from the nozzles 12—12 to pass therethrough and through the mouths of the bottles 40—40 into the interior thereof. The speed of rotation of air locks 18 and 19, the movement of conveyor belts 44 and 51, and the length of the conveyor belts are interrelated and are dependent upon the period required for sterilization of the bottles. Since the sterilization period is directly controlled by the temperature maintained within the chamber 10, it is necessary that some temperature control means, such as the thermocouple 14 attached to the electrically operated valve 16, be employed. If the temperature exceeds a predetermined maximum, the thermocouple 14 causes the electrically operated valve 16 to reduce the amount of steam projected into the chamber 10 through nozzles 12—12. Conversely, should the temperature in chamber 10 drop below a predetermined minimum, thermocouple 14 causes the electrically operated valve 16 to open so as to admit more steam to chamber 10. The steam within chamber 10, if saturated, must be maintained under considerable pressure in order to obtain sterilization temperatures in excess of 212° F. Superheated steam would not need to be under pressure to exceed 212° F.

When the bottles 40—40 have been moved by the endless belt 44 adjacent the exit air lock 19, the fingers 52—52 move the bottles from the belt 44 onto the lower plate 31, and the rotation of the inner drum upon the shaft 35 moves the bottles from the interior of the chamber 10 into the atmosphere. No special precautions need be taken if the atmosphere is at or approximates room temperatures, or even lower temperatures where the sterilization temperatures do not materially exceed 212° F. In many instances, in fact most cases, the sterilized containers will be filled immediately with the material to be packaged, so that the air lock 19 may communicate directly with the filling machine.

It is preferred that the interior and exterior of the glass containers be subjected to the heating medium simultaneously, so that all surfaces of the containers are always at the same temperature. There is a permissible lag between the heating of the exterior and interior surfaces, which varies with the shape of the container, its wall thickness, type of glass involved, particular heating medium, etc. No critical time period can be set forth that would be generally applicable, but tests on a variety of soft glass containers which are now in wide use for foods, drugs, soft drinks, and the like, indicate that a lag period of about 4 seconds results in no injury to the glass containers. Although a certain percentage of breakage occurs, a lag of 25 seconds is deemed permissible with the usual soft glass containers. Breakage due to a time lag of 25 seconds is generally the result of a defect in the glass container.

The following examples illustrate the practice of the present invention and are intended to aid those skilled in the art in a thorough understanding thereof. Certain prior art examples are shown for comparison purposes:

*Example 1*

Fifty-nine glass containers composed of a wide variety of bottles used in packaging foods, drugs, hair-set, mercury, and the like, were placed mouth down, in a closed chamber while at a temperature of 52° F. The chamber was instantly filled with steam at 305° F. The interior of the glass containers was entirely contacted with the heating medium within approximately six seconds. The containers were held in the chamber for about 4 minutes and were then removed. One container, a vegetable jar, failed. This jar is believed to have been defective, however, since an identical jar survived much more rigorous tests.

In a process, identical to that above described except that the interior of the containers was contacted within about 4 seconds, no containers broke.

*Example 2*

Sixty-one glass containers of the type described in Example 1 were processed in the same manner except that the mouth of the containers were directed upwardly, thus increasing the time required for the heating medium to completely contact the interior of the containers to about 25 seconds. Four of the containers so processed failed, but at least one of these was known to be defective.

*Example 3*

Following the procedure set forth in Example 2, except that the mouths of the glass containers were partially sealed to increase the time lag between contacting the outside and the inside of the containers with heating medium to about 65 seconds, 62 containers were treated and 12 of these containers failed.

*Example 4*

Sixty-eight glass containers were filled with water at 65° F. and placed in an upright position within a chamber filled with steam, as in Example 1. Following the same procedure as in Example 1, 22 of these containers failed. The time lag between contacting the interior and the exterior of the containers was about 155 seconds.

The term "completely contact," as used in the above examples, is intended to designate contact to the extent that the surface of the container is heated to within 25° of the heating medium.

The above examples show that with regard to soft glass containers, a time lag of 25 seconds between contacting the inside and outside of the glass containers with a heating medium results in about 6% failures. This figure is high since at least one container was already defective, which would lower this percentage to about 5%. By increasing this time lag to 65 seconds, the number of failures was increased to about 20%, a figure so high as to make such a procedure commercially impractical. More than 30% failures occurred when the time lag was increased to 155 seconds. Thus, the preferred embodiment of this invention is to project the heating medium into the interior of the glass containers simultaneously with the contact of the exterior with the heating medium. A time lag of 4 to 6 seconds is preferred, where a lag is necessary although up to 25 seconds can be tolerated.

With regard to the general applicability of this invention, it is a generally recognized fact that normal containers made of soft soda-lime-silica glass will withstand a temperature gradient up to about 100° F. between inside and outside of the containers. This fact is reflected in the description of the Standard Method of Thermal Shock Test on Glass Containers of the American Society for Testing Materials which was published in A. S. T. M. Designation; C149-43 in 1943. That description specifies that the test is started by imposing a temperature differential of 75° and that the containers be given a "progressive test" in which the temperature differential is increased in steps of 5° F. until at least 50 percent of the containers are broken. Therefore, the importance of this invention is limited when the sterilizing temperature is less than 100° higher than the initial temperature of the glass containers.

The rate at which the minimum temperature of the original temperature differential approaches the sterilizing temperature may be lower when the temperature differential is low then when the temperature differential is high. For example, when the original temperature differential is 240° F., the temperature differential must be decreased to 25° F. in approximately four seconds whereas when the original temperature differential is 175° F., the temperature differential may be reduced much more slowly; 20 seconds may be used to reduce the temperature differential to 100° F.

The present invention has been described above in detail, and has been illustrated by a specific embodiment thereof followed by examples of the invention as carried out in actual practice. It will be obvious to those skilled in the art that numerous variations and modifications may be made in the specific embodiment of the invention above illustrated without departing from the scope thereof. It will be apparent that all types and shapes of bottles or other glass containers may be treated according to the present invention, and that these containers may be positioned other than with the mouth downward. The apparatus shown is purely schematic, and numerous departures therefrom, such as different types of steam nozzles, different types of temperature control, differently constructed air locks and conveyors may be employed without departing from the present invention. Furthermore, batch processes may be employed as compared with the continuous process illustrated in the drawings, although the continuous process is preferred. In addition, the use of nozzles may be completely omitted and the steam or other sterilizing medium introduced through an unrestricted inlet.

It is evident from the above detailed description that the present invention relates to a method of sterilizing glass containers at high temperatures, and includes the step of contacting all of the surfaces of the container while at approximately room temperature, and in some cases even lower, with a heating medium heated to the sterilization temperature within a predetermined time after the first contact between the heating medium and the container. By utilizing the present invention, glass containers may be rapidly and safely subjected to the high sterilization temperatures necessary to provide an economical short-period high-temperature sterilization process. This process, while greatly reducing the time and multiple handling of the container required in the usual sterilization process, is fully as effective from a sterilization standpoint. In addition, the present process may be carried out with simple, inexpensive equipment, and in an economical manner.

What I claim is:

1. The method of sterilizing empty heavy walled soft glass containers which comprises conveying each container having a temperature of approximately room temperature into a chamber filled with steam having a temperature betwen 240° F. and 325° F. and projecting within six seconds thereafter steam into the interior of said container so as to completely contact the interior thereof with steam at a temperature not more than 25° F. below the temperature of the heating medium filling the chamber, and thereafter retaining the container within the heating chamber until the container has been effectively sterilized with respect to highly heat resistant bacterial spores.

2. The method of sterilizing empty heavy walled soft glass food containers which are at room temperature, the same comprising the steps of conveying the empty heavy walled glass food containers into a chamber filled with steam, said steam in said chamber having a temperature of approximately 305° F. and simultaneously with the entrance of the container into the steam filled chamber projecting steam having the approximate temperature of the steam within the chamber directly into the mouth of the container and thereafter conveying the container through the steam filled chamber.

CHARLES OLIN BALL.

References Cited in the file of this patent

UNITED STATES PATENTS

| Number | Name | Date |
|---|---|---|
| 1,217,113 | Darnall | Feb. 20, 1917 |
| 1,270,798 | Dunkley | July 2, 1918 |
| 2,268,563 | Ball | Jan. 6, 1942 |
| 2,514,027 | Clifcorn et al. | July 4, 1950 |
| 2,549,216 | Martin | Apr. 17, 1951 |

FOREIGN PATENTS

| Number | Country | Date |
|---|---|---|
| 587,056 | Great Britain | Apr. 11, 1947 |